US009547686B1

(12) United States Patent
Kashalikar et al.

(10) Patent No.: US 9,547,686 B1
(45) Date of Patent: Jan. 17, 2017

(54) SYSTEMATIC APPROACH TO DETERMINE SOURCE OF DATA QUALITY ISSUE IN DATA FLOW IN AN ENTERPRISE

(71) Applicant: INTERNATIONAL BUSINESS MACHINES CORPORATION, Armonk, NY (US)

(72) Inventors: Kunjavihari M Kashalikar, Littleton, MA (US); Cassio Dos Santos, Littleton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/011,244

(22) Filed: Jan. 29, 2016

(51) Int. Cl.
 *G06F 17/30* (2006.01)
(52) U.S. Cl.
 CPC ... *G06F 17/30371* (2013.01); *G06F 17/30303* (2013.01)
(58) Field of Classification Search
 None
 See application file for complete search history.

(56) References Cited

U.S. PATENT DOCUMENTS

| 8,983,914 B2 | 3/2015 | Kung et al. | |
|---|---|---|---|
| 2008/0222068 A1* | 9/2008 | Bahl | G06N 5/043 706/46 |
| 2009/0158096 A1* | 6/2009 | Ali | H04L 41/0677 714/43 |
| 2010/0318852 A1* | 12/2010 | Zheng | G06F 11/3664 714/37 |
| 2011/0320460 A1* | 12/2011 | Fankhauser | G06Q 10/10 707/748 |
| 2013/0051248 A1* | 2/2013 | Pei | H04L 41/0677 370/245 |
| 2014/0279934 A1 | 9/2014 | Li et al. | |
| 2015/0058278 A1* | 2/2015 | Fankhauser | G06F 17/30563 707/602 |

OTHER PUBLICATIONS

"Lineage-driven Fault Injection," by Alvaro et al. In: SIGMOD'15 (May 31-Jun. 4, 2015). Available at: ACM.*

* cited by examiner

*Primary Examiner* — Belix M Ortiz Ditren
(74) *Attorney, Agent, or Firm* — Shimokaji IP

(57) ABSTRACT

A method may include applying periodically a data validation rule to data transformed through a data processing system, wherein the data validation rule applies aspects selected from a group consisting of data value range, specific data values, and relationship with other data entries; responsive to detecting a violation of the data validation rule, identifying a portion of the transformed data for lineage assessment; examining the identified transformed data iteratively upstream at a previous transformation node in a lineage graph, until the method detects a node where the violation of the data validation rule can't be reproduced; creating a separate node in a distributed network for each of the previous transformation nodes in the lineage graph; and identifying the separate node in the distributed network introducing the violation of the data validation rule.

1 Claim, 1 Drawing Sheet

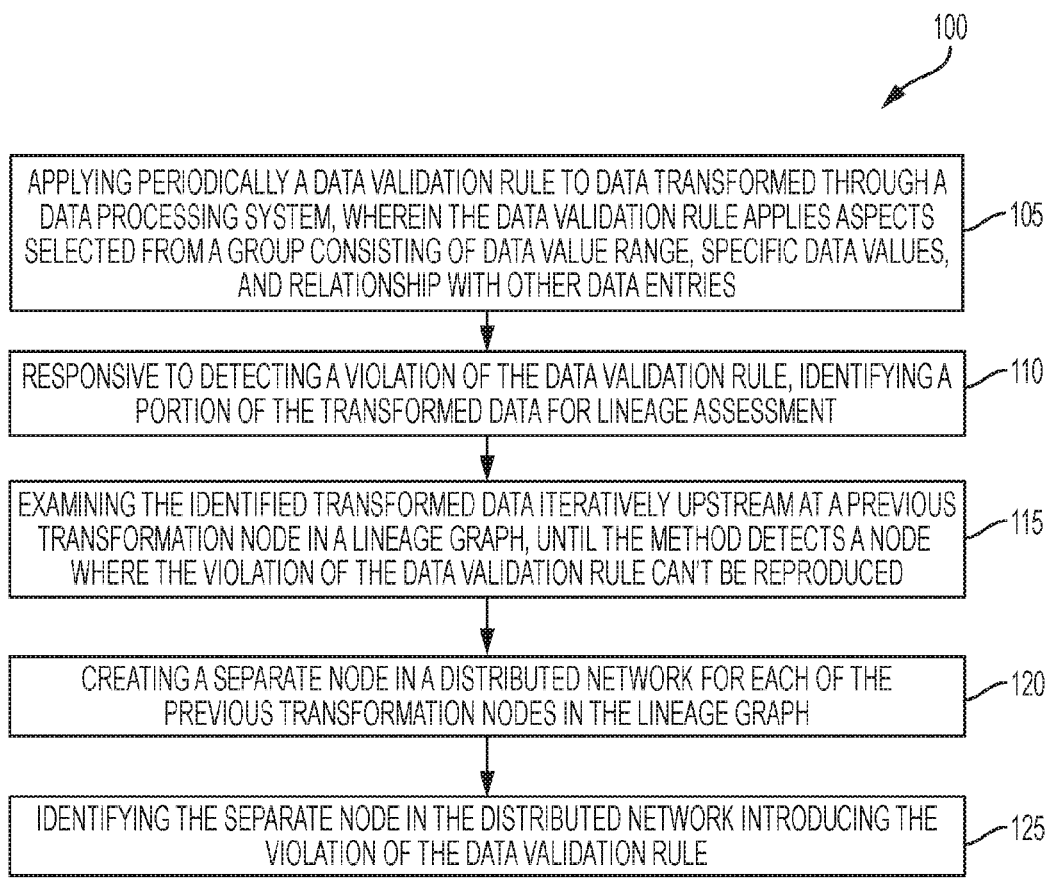

SYSTEMATIC APPROACH TO DETERMINE SOURCE OF DATA QUALITY ISSUE IN DATA FLOW IN AN ENTERPRISE

BACKGROUND OF THE INVENTION

The present invention generally relates to data quality. More particularly, the present invention relates to determining quality of data at a destination.

Data can contain errors after arriving at a destination from a source. It is important to determine the quality of data that has arrived at a destination.

As can be seen, there is a need for a method for determining quality of data at a destination.

SUMMARY OF THE INVENTION

In one aspect, a method may include applying periodically a data validation rule to data transformed through a data processing system, wherein the data validation rule applies aspects selected from a group consisting of data value range, specific data values, and relationship with other data entries; responsive to detecting a violation of the data validation rule, identifying a portion of the transformed data for lineage assessment; examining the identified transformed data iteratively upstream at a previous transformation node in a lineage graph, until the method detects a node where the violation of the data validation rule can't be reproduced; creating a separate node in a distributed network for each of the previous transformation nodes in the lineage graph; and identifying the separate node in the distributed network introducing the violation of the data validation rule.

These and other features, aspects and advantages of the present invention will become better understood with reference to the following drawings, description and claims.

BRIEF DESCRIPTION OF THE DRAWINGS

The FIGURE is a depiction of a workflow containing detailed textual description of a step which is then repeated.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method of identifying a root cause of a data quality issue in a data flow.

In the FIGURE, a method 100 may include a step 105 of applying periodically a data validation rule to data transformed through a data processing system, wherein the data validation rule applies aspects selected from a group consisting of data value range, specific data values, and relationship with other data entries. A step 110 may include responsive to detecting a violation of the data validation rule, identifying a portion of the transformed data for lineage assessment. A step 115 may include examining the identified transformed data iteratively upstream at a previous transformation node in a lineage graph, until the method detects a node where the violation of the data validation rule can't be reproduced. A step 120 may include creating a separate node in a distributed network for each of the previous transformation nodes in the lineage graph. A step 125 may include identifying the separate node in the distributed network introducing the violation of the data validation rule.

In an embodiment, the method 100 may include upstream tracking movement of data, using lineage, inspecting and comparing data rule results at successive predecessor of data destination and identifying an earliest step in data movement where a problem manifests itself. The method 100 may present details to a data quality expert to determine a right point in data movement to apply a remedy to insure a data issue is fixed.

In an embodiment, the method 100 may use data rules to validate data sources and flag records that are an exception to a data rule. A lineage graph can store details of data movement and transformation from source to target, with each node of the graph representing a successive state of the data during its movement. Data rule executions, if carried out along intermediate stopping points of data movements, can have the ability to store results in a Data Quality Exception Database. When data storage is assessed for data quality, it can generate a set of exception records, which may contain details of a quality issue at the record level, including details such as columns where the error may manifest, such as primary key of a table.

In an embodiment, the method 100 may start with a data source where an execution of a data rule created an exception. As an example, the data source may be a data destination of a data processing workflow. A data source may be taken under inspection, to review data fields that have errors. Following a lineage graph, at every predecessor node where data is moved from or transformed from, the method 100 may evaluate a result of data rule validation, either using exception records available for the data source or by using a sampling strategy and evaluating data rule against the samples. The method 100 may compare the result, and determine if within the two nodes, whether the previous node had better quality or not. If the predecessor node has equal or better quality, then the successor node may be where the problem occurred or the problem may have occurred during transformation between the two nodes. In an embodiment, sample exception records may be evaluated, and the exception records may contain primary key values that may allow specific rows to be traced upstream and the data validation rule to be re-evaluated to confirm that a violation of the data validation rule is still detected for the same rows. In another implementation, if data rule validation details are not available, the method 100 using a sampling mechanism, can validate a predecessor node for data errors. The method 100 can allow an organization to remediate data quality issues at an earliest point in the life cycle of data.

In an embodiment, the method 100 may generate an exception from running an operational data quality rule (data rules which can be associated with a governance rule). In an embodiment, a lineage graph may be traversed upstream, starting from an asset that a rule ran against and an exception was reported on (may be a column in a table that was bound to a rule variable). A goal may be to run the same operational rules at each step, or adapted rules, with the added ability to trace where the data collected in reported exception records is coming from when attempting to retro-fit a rule to multiple sources. This may allow detection of a point in a work flow where a reported exception or something contributing to that exception is taking place, so that the problem can be fixed/addressed at the root. This process can be repeated for all work flows involving an asset in question, or for all exceptions involving columns contributing to a given report. This can allow, for instance, a problem in a data table column that stems from bad or missing values in a reference table accessed upstream to be handled by fixing a reference table, with the option to assign the same/adapted operational rule to that asset.

In an embodiment, the method 100 may find records that do not pass validation criteria, and may produce an exception record, which may highlight data errors in a data source under inspection. When an exception is reported and prioritized, the exception may be evaluated with a data rule to determine a type of error and a data field that fails validation criteria. A data source may be inspected to review lineage information. Lineage information can be used to identify a graph that depicts movement of data to its destiny. The method 100 may trace a graph from a destination upstream (lineage) and determine quality or exceptions to quality at every node in the graph. The method 100 may be applied to any data asset node in a data processing workflow where rule violations were detected. Using details in an exception set generated by data rules in a Data Rule engine or applying sampling, the method 100 may determine what is the earliest node in the lineage graph, where the quality issue was introduced. Either the details may be available in exception records stored in the Data Quality Exception Database (including primary key values), or sampling can be used to reproduce violations.

In an embodiment, the method 100 may determine if each node in the lineage graph was subjected to a related data rule. The results from an executed data rule may be used to compare results from a predecessor node and successor node to the executed data rule and identify if either the predecessor or successor node was the original node where a data problem was introduced. If a node does not have data rule applied to it, the method 100 may create a data rule using a data rule at the successor node and the transformation applied when moving data to the successor node.

In an embodiment, at an end of the process, the method may identify an earliest point in the data movement pipeline where the data issue was introduced, allowing an organization to solve an issue at a source, avoiding all the issues that occur in later parts of the data movement pipeline.

It should be understood, of course, that the foregoing relates to exemplary embodiments of the invention and that modifications may be made without departing from the spirit and scope of the invention as set forth in the following claims.

What is claimed is:

1. A method for identifying a root cause of a data quality issue in a data flow comprising:
    applying periodically a data validation rule to data transformed through a data processing system,
    wherein the data validation rule applies aspects selected from a group consisting of data value range, specific data values, and relationship with other data entries;
    responsive to detecting a violation of the data validation rule, identifying a portion of the transformed data for lineage assessment;
    identifying a current node in a lineage graph;
    determining, for each of a plurality of other nodes in the lineage graph, whether the data transformed through the data processing system has been moved from a respective node in the lineage graph, or the data transformed through the data processing system has been transformed at the respective node;
    creating exception records that record exception properties of the data transformed through the data processing system, wherein the created exception records are created in response to execution of the data validation rule producing an exception;
    examining the identified transformed data iteratively upstream at a previous transformation node from the current node in the lineage graph where the identified transformed data is moved from or transformed from the previous transformation node, until the method detects a node where the violation of the data validation rule can't be reproduced;
    selecting a plurality of the exception records as sample records;
    determining whether the current node or the previous transformation node contains the violation of the data violation rule; and
    determining that a root cause of a data quality issue was created between the current node and the previous transformation node in response to the previous transformation node having equal or less occurrences of the violation of the data violation rule than the current node.

* * * * *